United States Patent
Wagner et al.

(10) Patent No.: US 12,169,007 B2
(45) Date of Patent: Dec. 17, 2024

(54) METHOD FOR PRODUCING A BRAKE DISC, AND BRAKE DISC

(71) Applicant: Robert Bosch GmbH, Stuttgart (DE)

(72) Inventors: Jan-Claus Wagner, Eschenburg (DE); Ingo Barzen, Remscheid (DE); Kangjian Wu, Marburg (DE); Thomas Pfeiffer, Steffenberg (DE); Ilja Potapenko, Biedenkopf (DE)

(73) Assignees: Robert Bosch GmbH, Stuttgart (DE); Buderus Guss Gmb, Breidenbach (DE)

( * ) Notice: Subject to any disclaimer, the term of this patent is extended or adjusted under 35 U.S.C. 154(b) by 580 days.

(21) Appl. No.: 16/960,036

(22) PCT Filed: Jan. 11, 2019

(86) PCT No.: PCT/EP2019/050630
§ 371 (c)(1),
(2) Date: Jul. 3, 2020

(87) PCT Pub. No.: WO2019/138035
PCT Pub. Date: Jul. 18, 2019

(65) Prior Publication Data
US 2020/0347897 A1     Nov. 5, 2020

(30) Foreign Application Priority Data
Jan. 11, 2018   (DE) .................. 10 2018 200 321.1

(51) Int. Cl.
*F16D 65/12*      (2006.01)
*F16D 65/00*      (2006.01)
(Continued)

(52) U.S. Cl.
CPC ....... *F16D 65/0025* (2013.01); *F16D 65/123* (2013.01); *F16D 65/125* (2013.01);
(Continued)

(58) Field of Classification Search
CPC .. C23C 18/32; C25D 3/04; C25D 3/12; F16D 65/12; F16D 65/125–128
(Continued)

(56) References Cited

U.S. PATENT DOCUMENTS

| | | | | |
|---|---|---|---|---|
| 4,808,275 A | * | 2/1989 | Ohzora | ................... C23C 26/02 188/218 XL |
| 2008/0142319 A1 | * | 6/2008 | Manter | ................ B23K 1/0018 188/218 XL |

(Continued)

FOREIGN PATENT DOCUMENTS

| | | |
|---|---|---|
| CN | 201884525 U | 6/2011 |
| CN | 103185087 A | 7/2013 |

(Continued)

OTHER PUBLICATIONS

International Search Report corresponding to PCT Application No. PCT/EP2019/050630, mailed Mar. 27, 2019 (German and English language document (11 pages).

*Primary Examiner* — Christopher P Schwartz
(74) *Attorney, Agent, or Firm* — Maginot, Moore & Beck

(57) ABSTRACT

In a method for producing a brake disc for a motor vehicle, a base disc, which is made of cast iron or aluminum in particular, is provided and equipped with an anti-corrosion layer. The anti-corrosion layer is applied using a wet chemical or galvanic method.

7 Claims, 1 Drawing Sheet

(51) Int. Cl.
*F16D 65/847* (2006.01)
*F16D 65/02* (2006.01)

(52) U.S. Cl.
CPC ......... *F16D 65/128* (2013.01); *F16D 65/847* (2013.01); *F16D 2065/1328* (2013.01); *F16D 2200/0013* (2013.01); *F16D 2200/0017* (2013.01); *F16D 2200/003* (2013.01); *F16D 2200/0082* (2013.01)

(58) Field of Classification Search
USPC .............. 188/18 A, 218 XL, 264 A, 264 AA
See application file for complete search history.

(56) References Cited

U.S. PATENT DOCUMENTS

| | | | | |
|---|---|---|---|---|
| 2011/0278116 A1* | 11/2011 | Lembach | ................ | F16D 69/02 |
| | | | | 188/218 XL |
| 2011/0293849 A1* | 12/2011 | Lembach | .............. | F16D 65/127 |
| | | | | 427/535 |
| 2013/0153345 A1* | 6/2013 | Kuckert | ................ | F16D 65/127 |
| | | | | 188/218 XL |
| 2016/0333949 A1* | 11/2016 | Nagai | ................... | F16D 65/128 |
| 2017/0122392 A1* | 5/2017 | Lembach | ................ | F16D 69/04 |
| 2019/0056003 A1* | 2/2019 | Carminati | ............. | C23C 28/027 |
| 2020/0378459 A1* | 12/2020 | Carminati | ............. | F16D 69/027 |

FOREIGN PATENT DOCUMENTS

| | | | | |
|---|---|---|---|---|
| DE | 10 2013 221 737 A1 | | 4/2015 | |
| DE | 10 2014 202 068 A1 | | 8/2015 | |
| DE | 10 2014 205 666 A1 | | 10/2015 | |
| EP | 0 040 054 A1 | | 11/1981 | |
| EP | 2783125 A1 | * | 10/2014 | ........... F16D 65/127 |
| JP | S59-62738 A | | 4/1984 | |
| JP | 2000-226688 A | | 8/2000 | |
| JP | 2004-52065 A | | 2/2004 | |
| JP | 2006-193788 A | | 7/2006 | |
| JP | 2013-241981 A | | 12/2013 | |

* cited by examiner

METHOD FOR PRODUCING A BRAKE DISC, AND BRAKE DISC

This application is a 35 U.S.C. § 371 National Stage Application of PCT/EP2019/050630, filed on Jan. 11, 2019, which claims the benefit of priority to German Patent Application No. DE 10 2018 200 321.1, filed on Jan. 11, 2018 in Germany, the disclosures of which are incorporated herein by reference in their entirety.

The disclosure relates to a method for producing a brake disk for a motor vehicle, a base disk, in particular made from cast iron or aluminum, being supplied and being provided with an anti-corrosion coating on at least one surface.

Furthermore, the disclosure relates to a brake disk for a motor vehicle, in particular produced by way of the abovementioned method, with a base disk, in particular made from cast iron or aluminum, and an anti-corrosion coating on at least one surface of the base disk.

BACKGROUND

In the case of conventional brake disks, in particular those which have a cast iron base disk, surfaces of the brake disk are provided with an anti-corrosion coating consisting of a paint which is suitable to this end, in order to reduce the corrosion tendency. Zinc dust paint, for example, has proved to be a reliable paint material. The painting is usually carried out with the aid of spray nozzles, in order to meet the requirements of a homogeneous paint thickness or coating thickness. In the case of ventilated brake disks which have cooling ducts, it is not readily possible for all surfaces in the respective cooling duct to be coated with a homogeneous thickness, on account of partitions and undercuts. This can lead to locations sporadically remaining unpainted.

SUMMARY

The method according to the disclosure has the advantage that even a cooling duct is protected reliably against a corrosion tendency by way of an anti-corrosion coating. In particular, it is achieved that that surface of the brake disk which is to be coated is provided overall with a homogeneous layer thickness. To this end, it is provided according to the disclosure that the anti-corrosion coating is applied by way of a wet-chemical or galvanic method. Here, the introduction of spray nozzles or the like into or onto a cooling duct is dispensed with. Instead, the desired surfaces of the brake disk are loaded overall with a coating material which produces the desired anti-corrosion coating in a homogeneous manner by way of the chemical or galvanic deposition on the at least one surface of the brake disk. This ensures in a simple and inexpensive way that the anti-corrosion coating is produced in a homogeneous manner.

Furthermore, it is preferably provided that chemical or galvanic nickel is applied as anti-corrosion coating. The nickel coating has already proven to be reliable and wear-resistant.

As an alternative, chromium or an alloy, in particular a chromium alloy, is preferably applied as anti-corrosion coating. As a result, reliable anti-corrosion protection for the brake disk is also provided by way of the chemical or galvanic coating method.

Furthermore, it is preferably provided that the brake disk is provided with at least one cooling duct, and that only the at least one cooling duct is provided with the anti-corrosion coating. This achieves a situation where other surfaces of the brake disk, in particular those which serve as brake surface, or, for example, also a brake disk hat of the brake disk, are not loaded or coated with the selected material of the anti-corrosion coating.

Furthermore, it is preferably provided that at least one brake surface and a brake disk hat of the blue disk or of the at least one cooling duct are sealed toward the outside before the coating operation. This ensures that other surfaces of the base disks outside the at least one cooling duct are not loaded and therefore also not coated during the coating method. As a result, the abovementioned advantages are achieved in a simple way.

The brake disk according to the disclosure with the features described herein is distinguished by the fact that at least one surface of the base disk has a wet-chemical or galvanic anti-corrosion coating. The abovementioned advantages arise as a result. Further advantages and preferred features and combinations of features result, in particular, from what has been described above.

BRIEF DESCRIPTION OF THE DRAWINGS

In the following text, the disclosure is to be described in greater detail on the basis of the drawing, in which.

DETAILED DESCRIPTION

Figure 1:
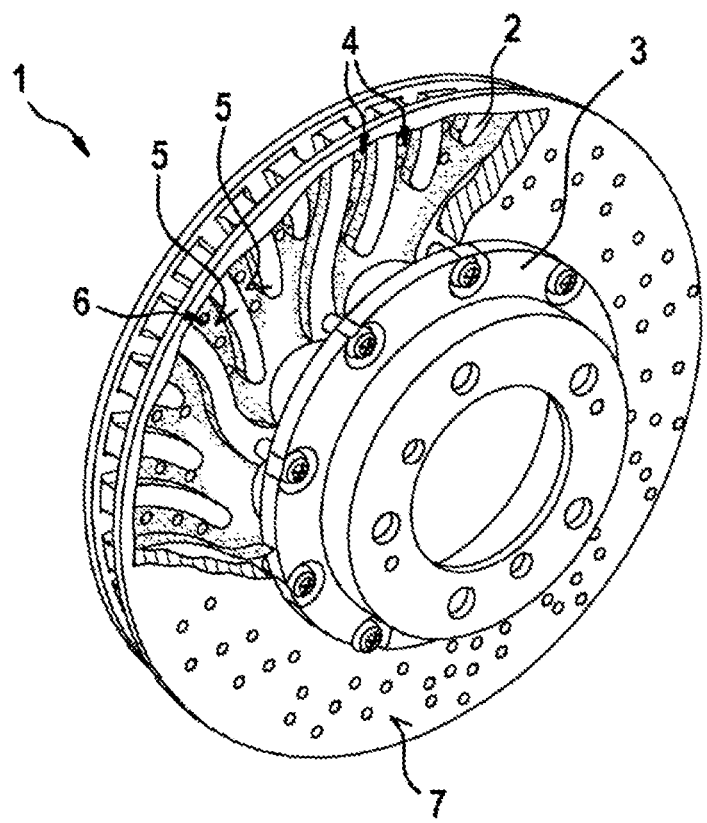
FIG. 1 shows an advantageous brake disk in a simplified illustration.

FIG. 1 shows an advantageous brake disk 1 in a simplified perspective partially sectioned illustration. The brake disk 1 has a circularly annular base disk 2, to which a brake disk hat 3 is fastened which as an alternative can also be configured in one piece with the base disk 2.

The base disk 2 has a multiplicity of integrated cooling ducts 4 which extend from the inner circumference as far as the outer circumference of the brake disk 2. Here, the cooling ducts 4 run in a manner which differs substantially from a radial extent, in particular in a curved manner from the inside toward the outside. Here, moreover, adjoining cooling ducts 4 are of different design.

In the present case, the base disk 2 is manufactured from cast iron or aluminum, possibly with a wear protection layer, and has a coating 6, in particular, in the region of the cooling ducts 4 on surfaces 5 of the cooling ducts 4 in order to avoid corrosion. In particular, all the surfaces of the brake disk 1 which face the cooling duct 4 are provided with the anti-corrosion coating 6.

Figure 2:
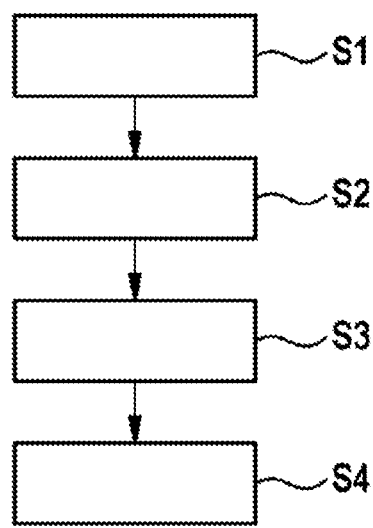
FIG. 2 shows an advantageous method for producing the brake disk.

In order to apply the anti-corrosion coating 6, the method which is shown in a simplified manner in FIG. 2 is used. In a first step S1, the base disk 2 is provided with its configured cooling ducts 4. In a following step S2, the cooling ducts 4 are sealed toward the outside with the aid of seal elements. To this end, for example, a seal ring is attached on the base disk 2 on its outer circumference, which seal ring covers and seals all the outlet openings of the cooling ducts 4 on the outer circumference. A corresponding procedure is carried out, for example, on the inner circumference of the base disk 2.

Subsequently, in a following step S3, the surfaces 5 of the cooling ducts 4 are provided with the anti-corrosion coating 6 by way of a wet-chemical or galvanic method. To this end, first of all liquid is introduced into the cooling ducts 4 until the latter are filled completely with the liquid.

In accordance with one alternative exemplary embodiment, the cooling ducts 4 are not sealed toward the outside and the liquid is not filled into the cooling ducts, but rather the brake surface 7 and the brake disk hat 3 are sealed or covered with a protective layer, with the result that the base disk 2 overall can be dipped into the liquid, as a result of which the cooling ducts 4 overall are flooded and, on account of the protective layer, the brake surface 7 and the brake hat 3 do not come into contact with the liquid, with the result that only the cooling ducts 4 or their surfaces 5 are ultimately loaded and coated as desired.

The liquid is, for example, an electrolytic bath for the galvanic application of the anti-protection coating, or a gaseous or vaporous medium used for the wet-chemical coating. For the galvanic coating, for example, nickel is introduced into the liquid, and an electric voltage is set between the nickel and the base disk, with the result that the metal ions of the nickel are released from the nickel electrode and accumulate on the base disk. As a result, the surfaces 5 in the respective cooling duct 4 are coated with the nickel in a homogeneous manner. Instead of nickel, other galvanically suitable materials can also be used, such as chromium or an alloy.

Nickel is used, for example in a chemical manner, in order to carry out a wet-chemical coating method.

On account of the throughflow of the cooling ducts 4 with the chemicals which are necessary for the coating process, each location in the respective cooling duct 4 is reached and coated reliably. As a result, a homogeneous coating of the surfaces 5 in the respective coolant duct 4 is ensured. At the same time, it is ensured that outer surfaces of the base disk 2, such as the brake surfaces 7, are not provided with the anti-corrosion coating.

After the respective coating method is carried out, the seal elements or protective layers are removed again and, in step S4, the finished brake disk 1 is made available.

Excellent adhesion and contour accuracy are achieved on the cast disk base disk 2 by way of the advantageous galvanic nickel coating for the anti-corrosion coating. Thick layers without discernible pores can also be produced with layer thicknesses in the region of several tens of μm. Even greater layer thicknesses are possible on account of a lack of stress. Immediately after the deposition, what is known as a passivation layer is formed on the surface of the anti-corrosion coating, in particular made from nickel, which passivation layer, as a diffusion barrier, reliably prevents a further transformation as a result of corrosive attack and, as a result, reliably protects the brake disk 1 against corrosion. By way of the seal elements, the throughflow of the chemicals is restricted to the respective cooling duct, and an undesired layer formation on the brake surface 7 and also on the brake disk hat 3 is therefore prevented.

Even in the case of chemical coating of the cooling ducts 4, layer thicknesses of up to 80 μm can be produced, as a result of which reliable anti-corrosion protection is ensured.

The service life of the brake disk 1 is increased by way of the advantageous anti-corrosion protection by means of the anti-corrosion coating. This is also important, in particular, when the brake disk 1 is utilized comparatively sparsely for braking. This is the case, for example, in the case of electric vehicles or hybrid vehicles which are subject to less wear as a result of recuperative operation of an electric drive machine than motor vehicles which have merely a conventional internal combustion engine as drive device for accelerating and merely a friction brake system for retarding the motor vehicle.

The invention claimed is:

1. A method for producing a brake disk for a motor vehicle, comprising:
   applying an anti-corrosion coating on a base disk by way of a wet-chemical or galvanic method, wherein the base disk includes a brake surface and at least one cooling duct, and the applying of the anti-corrosion coating includes providing only the at least one cooling duct with the anti-corrosion coating.

2. The method as claimed in claim 1, wherein the applying of the anti-corrosion coating includes applying a chemical or galvanic nickel as the anti-corrosion coating.

3. The method as claimed in claim 1, wherein the applying of the anti-corrosion coating includes applying chromium or a chromium alloy as the anti-corrosion coating.

4. The method as claimed in claim 1, further comprising:
   before applying the anti-corrosion coating, sealing at least one of the brake surface and a brake disk hat thereby preventing coating of the at least one of the brake surface and the brake disk with the wet-chemical or galvanic method.

5. The method as claimed in claim 1, wherein the base disk is formed of cast iron or aluminum.

6. A brake disk for a motor vehicle, comprising:
   a base disk including a brake surface; and
   an anti-corrosion coating on only at least one cooling duct of the base disk, wherein:
   the anti-corrosion coating is a wet-chemical or galvanic coating; and
   all of the surfaces of the base disk facing the at least one cooling duct are coated with the anti-corrosion coating.

7. The brake disk as claimed in claim 6, wherein the base disk is formed of cast iron or aluminum.

* * * * *